US012725902B2

(12) United States Patent
Davis et al.

(10) Patent No.: US 12,725,902 B2
(45) Date of Patent: Sep. 1, 2026

(54) THERMAL MANAGEMENT FOR RF TRANSPARENT SYSTEMS

(71) Applicant: The United States of America, as Represented by the Secretary of the Navy, Crane, IN (US)

(72) Inventors: Cole R. Davis, Bloomington, IN (US); Manda Shaeffer, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 5 days.

(21) Appl. No.: 18/604,603

(22) Filed: Mar. 14, 2024

(65) Prior Publication Data

US 2024/0313387 A1 Sep. 19, 2024

Related U.S. Application Data

(60) Provisional application No. 63/462,696, filed on Apr. 28, 2023, provisional application No. 63/452,016, filed on Mar. 14, 2023.

(51) Int. Cl.
*H01Q 1/02* (2006.01)
*H01Q 1/42* (2006.01)

(52) U.S. Cl.
CPC ............... *H01Q 1/02* (2013.01); *H01Q 1/422* (2013.01)

(58) Field of Classification Search
CPC ........... H01L 2924/09701; H01L 2224/48091; H01Q 1/02; H01Q 1/42
See application file for complete search history.

(56) References Cited

U.S. PATENT DOCUMENTS

| | | | | | |
|---|---|---|---|---|---|
| 2,755,216 | A * | 7/1956 | Lemons | B64D 15/02 | 156/304.6 |
| 3,805,017 | A * | 4/1974 | Roberts | H05B 3/18 | 219/209 |
| 4,916,461 | A * | 4/1990 | Brazel | H01Q 1/281 | 428/113 |
| 6,107,976 | A * | 8/2000 | Purinton | H01Q 1/42 | 343/872 |
| 8,933,860 | B2 * | 1/2015 | Schlie | F28D 15/0266 | 361/689 |
| 11,199,447 | B1 * | 12/2021 | Hu | H01S 1/02 | |
| 11,817,242 | B2 * | 11/2023 | Hu | G01N 21/1702 | |

(Continued)

*Primary Examiner* — Nelson J Nieves
(74) *Attorney, Agent, or Firm* — Naval Surface Warfare Center, Crane Division; Patrick B. Law

(57) ABSTRACT

Provided are apparatus and methods for providing thermal management for RF transparent systems. In particular, a layered composite is provided that includes a first thermally conductive and RF transparent layer along with a second RF transparent system structural layer. The system also includes an attached heat sink(s) to reduce the effective operating temperature of the underlying materials in the RF transparent system such as the thermally conductive layer. Accordingly, the use of this thermal management system allows for the use of more conventional, lower-temperature RF transparent system materials in subsequent layers. Additionally, reducing the operating temperature with the thermally conductive layer and heat sink improves the RF transparency in the RF transparent system.

15 Claims, 3 Drawing Sheets

(56) References Cited

U.S. PATENT DOCUMENTS

| | | | | |
|---|---|---|---|---|
| 2010/0206523 | A1* | 8/2010 | Chen | H01Q 1/002<br>165/104.33 |
| 2011/0116230 | A1* | 5/2011 | Kwak | H01Q 1/42<br>361/688 |
| 2014/0190666 | A1* | 7/2014 | Schlie | F41G 11/00<br>165/104.21 |
| 2019/0280363 | A1* | 9/2019 | Dahle | H01Q 1/2283 |
| 2020/0262958 | A1* | 8/2020 | Takahashi | C08L 33/00 |
| 2022/0242335 | A1* | 8/2022 | Nakagawa | H01Q 1/1221 |
| 2022/0274887 | A1* | 9/2022 | Erb | B32B 18/00 |
| 2022/0334291 | A1* | 10/2022 | Deore | G02B 3/0087 |
| 2022/0349220 | A1* | 11/2022 | Ferri | G01S 13/87 |
| 2023/0059234 | A1* | 2/2023 | Lee | G06F 1/1692 |
| 2023/0170598 | A1* | 6/2023 | Stevenson | H01Q 17/001<br>343/702 |
| 2023/0299468 | A1* | 9/2023 | Liu | H01Q 1/405<br>455/562.1 |

* cited by examiner

THERMAL MANAGEMENT FOR RF TRANSPARENT SYSTEMS

CROSS-REFERENCE TO RELATED APPLICATIONS

The present application claims priority to U.S. Provisional Patent Application Ser. No. 63/452,016, filed Mar. 14, 2023 and U.S. Provisional Patent Application Ser. No. 63/462,696, filed Apr. 28, 2023, both entitled "THERMAL MANAGEMENT FOR RF TRANSPARENT SYSTEMS," the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 211474US03) is assigned to the United States Government and is available for licensing for commercial purposes. Licensing and technical inquiries may be directed to the Technology Transfer Office, Naval Surface Warfare Center Crane, email: Crane_T2@navy.mil.

FIELD

The present disclosure generally relates to radio frequency (RF) transparent systems, and more particularly to thermal management apparatus and methods for controlling the temperature of such systems.

BACKGROUND

Radio frequency (RF) transparent systems, such as may be found in radar domes (radomes), protect RF antennas and sensors from harsh environmental conditions while maintaining RF transparency (i.e., a low dielectric constant and loss tangent). Such RF transparent systems are typically made from either ceramic or polymer-based composites.

Ceramic-based RF transparent systems can withstand high temperatures and harsh environments but have poor RF transparency and therefore require a large amount of added porosity to reduce RF loss. As a result, porous ceramics are difficult to produce and are susceptible to mechanical instabilities and failures.

In contrast to ceramic-based RF transparent systems, polymer-based RF transparent systems have lower dielectric constants and loss tangents, and typically do not require added porosity, and are easier to manufacture. However, these materials cannot operate at high temperatures like ceramics without melting or decomposing.

The development of high-powered antennas, for example, more acutely require RF transparent systems with better temperature resistance, thermal management, and improved RF transparency, while maintaining practical manufacturability.

SUMMARY

The present invention relates to apparatus and methods for providing thermal management for RF transparent systems. In particular, the presently disclosed invention provides a layered composite structure using selected materials that both utilize unique material properties and creative material design to maximize the desired composite properties. Moreover, the present disclosure provides for use of a thermally conductive, RF transparent material layer and an attached heat sink to reduce the effective operating temperature of the underlying materials in the system. Accordingly, the use of this thermal management system allows for the use of more conventional, lower-temperature RF transparent materials in subsequent layers. Additionally, reducing the operating temperature with the thermally conductive layer and heat sink improves and provides consistent RF transparency for materials used in the RF transparent system.

According to some aspects, an apparatus for thermal management of a radio frequency (RF) transparent system is disclosed. The apparatus includes a first thermally conductive RF transparent layer. Further, the apparatus includes a second RF transparent material layer disposed next to the first thermally conductive RF transparent layer.

In yet some further aspects, a thermally managed radio frequency (RF) transparent system is disclosed. The system includes a first thermally conductive RF transparent layer, and a second RF transparent material layer disposed next to the first thermally conductive RF transparent layer. Additionally, the system includes one or more heat sinks devices thermally coupled to the first thermally conductive RF transparent layer and configured to remove heat from the RF transparent system.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
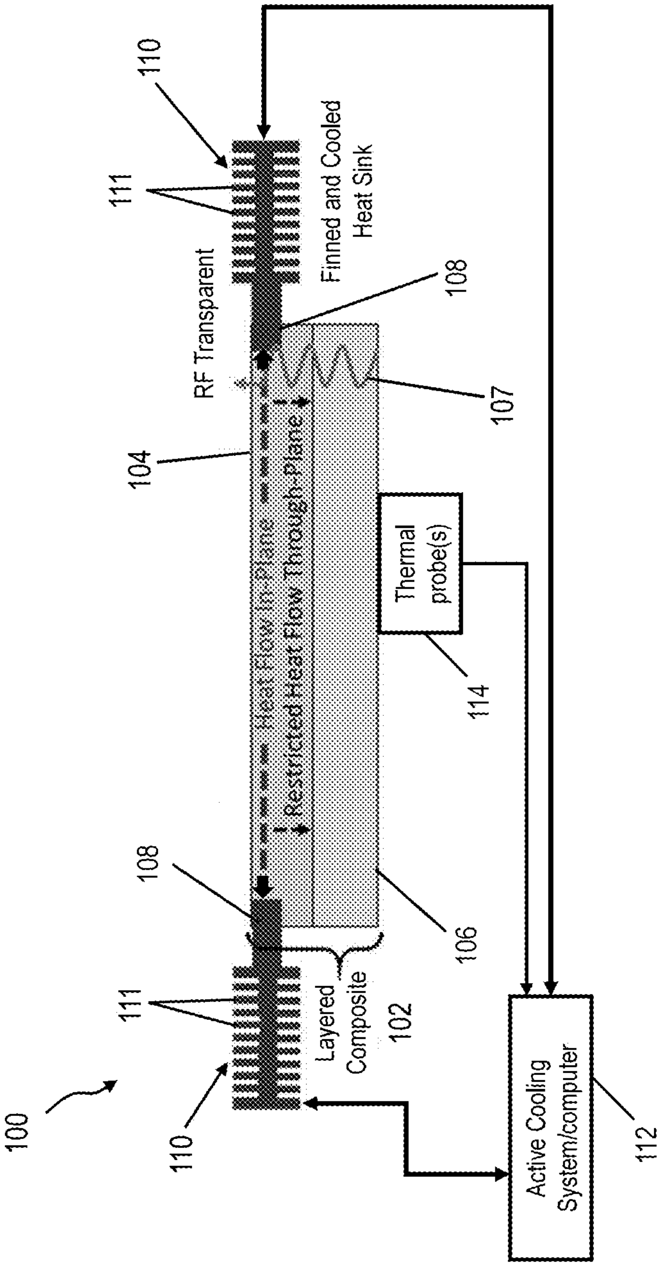
FIG. 1 illustrates a cross section of an exemplary thermal management system in an RF transparent system according to certain aspects of the present disclosure.

The embodiments of the invention described herein are not intended to be exhaustive or to limit the invention to the precise forms disclosed. Rather, the embodiments selected for description have been chosen to enable one skilled in the art to practice the invention.

As discussed above, the present invention relates to apparatus and method for providing thermal management for RF transparent systems. In particular, the presently disclosed invention provides a layered composite structure using selected materials that both utilize unique material properties and creative material design to maximize the desired composite properties. In particular, the present disclosure provides for use of a thermally conductive material layer and an attached heat sink to reduce the effective operating temperature of the underlying materials (e.g., subsequent material layers) in the RF transparent system. Accordingly, the use of this thermal management system allows for the use of more conventional, lower-temperature RF transparent materials in subsequent material layers. Additionally, reducing the operating temperature with the thermally conductive layer and heat sink improves and provides consistent RF transparency for materials used in the RF transparent system.

In aspects, a thermally conductive, RF transparent layer that may be used may be constructed of boron nitride nanotubes (BNNTs), BNNT fibers, or similar materials that exhibit directional, orthotropic thermal conductivity while maintaining RF transparency. Nano-scale boron nitride has improved orthotropic thermal conductivity along the nanotube direction over other materials and maintains good RF transparency. Still other materials that exhibit anisotropic thermal conductivity where the ratio between the in-plane and through-plane thermal conductivity is greater than one (1) may also be used. Additionally, other high temperature filler materials may be used in combination with thermally conductive material to transfer heat while maintaining RF transparency.

Alternatively, while ceramics may be more difficult to produce than polymers, it is nonetheless contemplated that certain ceramic structures may also be utilized, provided that the ceramic is sufficiently thin to minimize its impact on the RF transparency. Thus, in such structures, porosity would not need to be added when the ceramic layer is thin enough to minimize RF loss.

In such cases of thin ceramic or polymer structures, directional thermal conductivity can be achieved without the use of intrinsically anisotropic materials. Through structural design at a nanoscale, microscale, and macroscale, a bulk material can exhibit directional thermal conductivity. A thin, fully dense outer layer of a ceramic or polymer possessing high thermal conductivity can be produced with subsequent material layers containing various scales of porosity or graded with materials possessing lower thermal conductivity than the outer layer. As the porosity of the material increases, a more tortuous path is created, and phonon transport is hindered. This creates a material with bulk density gradients and, therefore, directional thermal conductivity exists with a larger thermal conductivity in the plane orthogonal to the density gradient. This approach is not limited to materials with intrinsic anisotropic thermal conductivity and allows for a broader selection of materials. Some materials that could be utilized for this design are to include but not limited to: Aluminum oxide ($Al_2O_3$), Boron Nitride (BN), Silicon Nitride ($Si_3N_4$), Aluminum Nitride (AlN), and Beryllium Oxide (BeO). In aspects, such materials may also be manufactured using additive manufacturing techniques that afford less difficult production, lower costs, and allow complex structural designs to optimize directional thermal conductivity. In further aspects, the manufacturing may start with a thin layer of fully dense ceramic or polymer and then start a density or material gradient in subsequent layers (i.e., subsequent ceramic or polymer layers building on a first thin layer that have various amounts and length-scales of porosity and are less thermally conductive than the first layer).

Moreover, the present invention may utilize an integrated heat sink material (e.g., metallic heat sink) into one or more of the RF transparent system layers to make contact and maintain thermal conductivity with the RF transparent system. The heat sink material is typically not RF transparent and would be located along the outer edge of the RF transparent system to avoid RF interference. The integrated heat sink material connections or couplings then may lead to larger heat sinks located out of the antenna or sensor's field of view. Furthermore, these larger heat sink(s) may be cooled using liquid, air, or phase change materials to continuously remove heat from the thermally conductive RF transparent layer.

In still further aspects, an active cooling temperature feedback system can be used to control cooling of the heat sinks. Thermocouple probes embedded in or on the surface of the RF transparent system or heat sink can monitor the temperature of the material and deliver this information to a computer-controlled system. This computer system can then activate the cooling system at a preset temperature. The purpose of a temperature feedback cooling system is to utilize the heat sinking to optimize and provide consistent RF performance over a range of temperatures.

FIG. 1 shows a cross-section of an exemplary thermal management RF transparent system apparatus 100, which may be used in an RF transparent system as one example. As shown, the system 100 includes a layered composite structure of an RF transparent system 102 that may be constructed of at least a first thermally conductive RF transparent layer, material, or structure 104 (e.g., an anisotropic thermally conductive material layer, and in more specific examples, an orthotropic thermally conductive layer, material or structure), and another second RF transparent material layer 106, which both allow transmission of RF energy shown representatively as a wave at 107. In one aspect, the first layer 104 is constructed of a material such as BNNTs, BNNT fibers, other materials with the same intrinsic directional thermal conductivity properties, or a thermally conductive material having a multi-scale structure that allows for heat flow in the plane of the layer 104, but restricts heat flow in the orthogonal direction, thus protecting the underlying or subsequent second RF transparent system material 106 from heat while allowing maximum heat flow to the attached heat sinks 110. In some aspects, the second RF transparent material layer 106 composition is selected to provide structural support for overall structure of the first and second layers (104, 106) where the selected material of the first layer 104 may not have strong structural support characteristics. Thus, in such cases the subsequent or underlying layers (e.g., second layer 106) provides the majority or all of the structural support for the composite (i.e., layers 104 and 106 combined).

Further, the first layer 104 may include thermal couplings or connections (which may be also referred to herein as heat sinks), such as metallic connections disposed at edges 108 of the first layer 104 to minimize interference of RF transmissions. These connections at 108 may be, in turn, further coupled to larger heat sinks 110, which may be finned and/or actively cooled (e.g., using fluids or phase change materials in some examples or using Peltier effect based cooling devices/structures in other examples). The first thermally conductive layer 104, thus, is protecting the underlying second layer structural material 106 from heat exposure and improving the overall RF transparency. In aspects, the combination of the metallic couplings 108 and the heat sinks 110 may be referred to collectively as a heat sink device (or devices) or a heat sink means. In further alternative aspects, the addition of active cooling to be described later with couplings 108 and/or 110 may also be referred to heat sink devices or heat sink means.

As will be appreciated by those skilled in the art, use of a thermally conductive, electrically insulating (RF transparent allowing transmission of RF energy shown at 107) material 104 serves as a protective shell for the underlying materials (e.g., second layer 106 and components within an apparatus using the apparatus 100). Again, the thermally conductive layer 104 is oriented in such a way that heat is transferred along the surface of the structure toward the heat sinks 108/110 and is minimized through the surface toward the second layer material 106. In further aspects, the heat sink coupling material 108 (e.g., thermally conductive metal) is bonded such that good thermal transfer exists between the thermally conductive layer 104 and the heat sink (108/110). The heat sink 110 may include fins 111 as illustrated in FIG. 1 for maximum surface area and can be cooled by air, liquid, or use of a phase change material.

Figure 2:
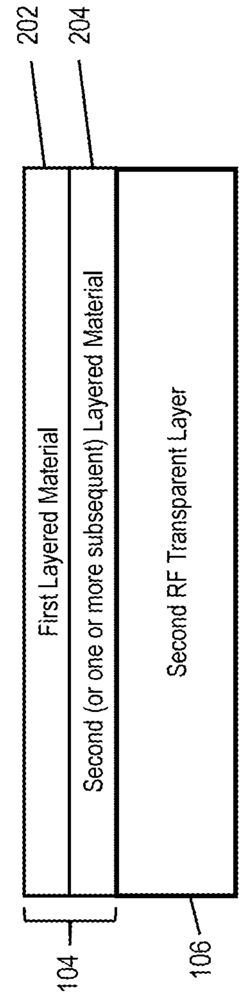
FIG. 2 illustrates an example of a layered structure of the first RF transparent layer illustrated in FIG. 1 according to certain aspects of the present disclosure.

According to further aspects, it is noted that the first thermally conductive RF transparent layer 104 may comprise ceramics or polymers having a plurality of layers as illustrated in the example of FIG. 2. As shown, the first RF transparent layer 104 may include a first thin layer material 202, which may be a ceramic or polymer material in some aspects. The first layered material 202 further possesses or has a first level of thermal conductivity. This first thin layer of the layer 104 may be located or disposed at the outer or top surface of first layer 104 (i.e., toward the top of FIG. 1) and facing an outside surface of a housing, such as will be described later with regard to FIG. 3. Next, the first thermally conductive RF transparent layer 104 may comprise one or more subsequent ceramic or polymer layers of a second layered material 204, disposed below the first thin layer 202. This second layered material 204 (or multiple layers in some other examples) may be constructed of ceramic or polymer materials that at least one of (1) possess or have a second level of thermal conductivity lower than the first level of thermal conductivity of the first layered material 202 or (2) possess various levels and length-scales of porosity that engender less thermally conductivity than the first thin layer of layer 104 composed of the first layered material. It is noted that the second layered material 204 could be constructed to have a selection of material with the lower second level of thermal conductivity as well as a structure with various length and length-scales of porosity. The exemplary structure illustrated by FIG. 2 affords directional or anisotropic thermal conductivity by either (1) changing the material in subsequent layers to materials that have lower thermal conductivity; (2) increase porosity in subsequent layers (which decreases the effective thermal conductivity), or (3) a combination of items (1) and (2) (i.e., material selection and structure increasing porosity).

In further alternative aspects, rather than merely a passive cooling system with heat sinks (e.g., heat sinks 108, 110, or a combination thereof), the system 100 may include an active cooling system/computer/controller 112 that can receive thermal temperature readings from sensors, such as a thermal probe (e.g., 114) or thermocouple. Although the probe 114 is shown disposed on a surface of the second material layer 106, one or more probes may be disposed on or within materials/layers 104 or 106, attached to the heat sinks 108/110, as well be placed as in other locations for measuring temperatures. The active cooling system 112 may control air, liquid, phase change material, Peltier effect materials, etc. to actively increase or decrease the cooling effected by the heat sink 108/110. This temperature feedback system (e.g., computer 112) can then activate the cooling system at a pre-programmed temperature. This will serve to optimize and maintain consistent RF performance at increasing operating temperatures.

Figure 3:
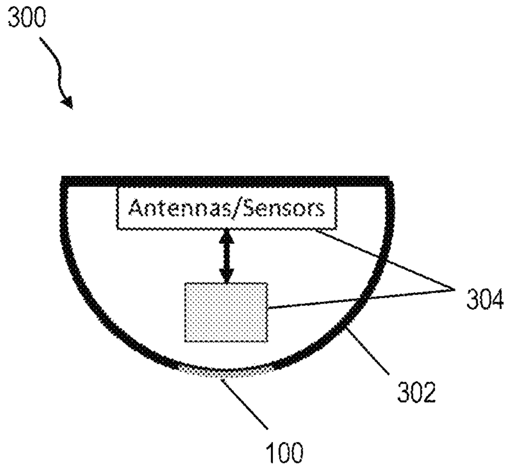
FIG. 3 illustrates an exemplary implementation of an RF transparent system in a device utilizing the presently disclosed RF transparent system structure according to aspects of the present disclosure.

A thermal management system configured according to FIGS. 1 and/or 2 can be utilized on several platforms including vehicles or high-power antenna devices, as examples. A general implementation is illustrated in FIG. 3 at 300. FIG. 3 illustrates a top or cross-sectional view of an exemplary RF transmitting device 300. The RF transmitting device 300 may include a housing 302 for antennas and/or sensors 304. In the illustrated example, an RF transparent system constructed according to the exemplary system 100 shown in FIG. 1 is mounted within the housing 302 and acts to protect the equipment (e.g., antenna and/or sensors 304) on the inside of the housing 302, while providing RF transparency to receive and/or transmit RF signals. As the device 300 reaches higher temperatures, the RF transparent system 100 including thermal management in accordance with the example of FIG. 1, transfers this heat to heat sinks that are away from the RF transparent portion to other locations (but that may be still located inside the device housing 302). In doing so, the RF transparent system 100 and the internal components (e.g., antennas/sensors 304) are protected from the buildup of heat, and the operating temperatures are reduced.

Applications for thermal management RF transparent systems such as shown in FIG. 1 are not limited to protection from external heat sources outside or external to housing 302, but can also be used to protect from the heat generated in high powered antennas. For example, the RF transparent system layers in FIG. 1 can be reversed so that the thermally conductive layer 104 is facing a heat-generating antenna. In situations where both external and internal heat sources are present, the thermally conductive layer 104 could be placed on both sides of the RF transparent system and attached to heat sinks. If the heat is generated within the first material layer 104 from absorption of electromagnetic energy due to high power antennas, the thermally conductive layer 104 can be layered throughout the RF transparent system and attached to heat sinks.

Features of the present invention include that the materials selected have unique properties or the material was manufactured in such a way to exhibit unique properties (e.g., multiscale porosity gradients) and the combination of these materials is what allows for the invention. BNNTs have one of the largest directional thermal conductivities of electrically insulating (dielectric) materials. This is important because materials that have high thermal conductivities are typically electrically conductive and not RF transparent. The incorporation of BNNTs into an RF transparent system design allows for heat transport away from the underlying material into a heat sinking material that is out of the antenna's field of view. The heat sinks, as described above, may be cooled using a temperature feedback system. Proper heat sink design allows heat to be absorbed from the RF transparent system, thereby reducing its operating temperature. Additionally, reducing the temperature of the RF transparent system may improve the RF performance as the RF loss in most materials increases as the temperature of the material increases.

In summary, the present invention affords numerous advantages including: (1) using heat sinks in combination with thermally conductive RF-transparent materials to remove heat from a RF transparent system and reduce its effective operating temperature; (2) active cooling temperature feedback system provides optimized cooling at maximum operating temperatures and assists with consistent RF performance; (3) allows for the use of lower temperature materials in temperature-sensitive RF transparent system applications; (4) reduces operating temperature and improves RF performance in composite RF transparent systems; (5) the thermal management system can be used externally on the RF transparent system to protect from outside heat sources; and (6) the thermal management system can be used internally on the RF transparent system to protect from internal heat sources.

Other features may include optimized concentration, orientation, and structure of BNNTs, BNNT fibers, other similar materials to achieve the desired thermal conductivity (e.g., orthotropic thermal conductivity); manufacturing methods to properly add a thermally conductive layer to an underlying RF transparent system material; adjusting the RF transparent system layer thickness to optimize RF performance; optimizing the thermal contact between heat sink and thermally conductive layer.

Although the invention has been described in detail with reference to certain preferred embodiments, variations and modifications exist within the spirit and scope of the invention as described and defined in the following claims.

What is claimed is:

1. An apparatus for thermal management of a radio frequency (RF) transparent system comprising:

a first thermally conductive RF transparent layer; and a second RF transparent material layer disposed next to and in contact with the first thermally conductive RF transparent layer;

wherein the first thermally conductive RF transparent layer is placed to reduce an operating temperature of the second RF transparent material layer and thereby protect the second RF transparent material layer from heat exposure.

2. The apparatus of claim 1, further comprising:

one or more heat sink devices thermally coupled to the first thermally conductive RF transparent layer and configured to remove heat from the RF transparent system.

3. The apparatus of claim 2, further comprising an active thermal management system capable of receiving heat measurement feedback and configured to actively control cooling of the one or more heat sink devices.

4. The apparatus of claim 2, wherein each of the one or more heat sink devices comprise a heat conductive coupling with the first layer and a finned heat sink thermally coupled with the heat conductive coupling.

5. The apparatus of claim 1, wherein the first thermally conductive RF transparent layer has anisotropic thermal conductivity.

6. The apparatus of claim 1, wherein the first thermally conductive RF transparent layer further has orthotropic thermal conductivity.

7. The apparatus of claim 1, wherein the first thermally conductive layer RF transparent comprises one or more of boron nitride nanotubes (BNNTs) and BNNT fibers.

8. The apparatus of claim 1, wherein the first thermally conductive RF transparent layer comprises a plurality of layers including:

a first layered material comprising ceramic or polymer material and possessing a first thermal conductivity; and one or more subsequent second layered materials comprising ceramic or polymer material and possessing at least one of:

(1) a second thermal conductivity lower than the first thermal conductivity; or (2) various levels and length-scales of porosity.

9. A thermally managed radio frequency (RF) transparent system comprising:

a first thermally conductive RF transparent layer;

a second RF transparent material layer disposed next to and in contact with the first thermally conductive RF transparent layer; and one or more heat sink devices thermally coupled to the first thermally conductive RF transparent layer and configured to remove heat from the RF transparent system;

wherein the first thermally conductive RF transparent layer is placed to protect the second RF transparent material layer from heat exposure.

10. The system of claim 9, further comprising an active thermal management system capable of receiving heat measurement feedback and configured to actively control cooling of the one or more heat sink devices.

11. The system of claim 10, wherein each of the one or more heat sink devices comprise a heat conductive coupling with the first layer and a finned heat sink thermally coupled with the heat conductive coupling.

12. The system of claim 9, wherein the first thermally conductive RF transparent layer has anisotropic thermal conductivity.

13. The system of claim 9, wherein the first thermally conductive RF transparent layer comprises a material having orthotropic thermal conductivity.

14. The system of claim 9, wherein the first thermally conductive layer RF transparent comprises one or more of boron nitride nanotubes (BNNTs) and BNNT fibers.

15. The system of claim 9, wherein the first thermally conductive RF transparent layer comprises a plurality of layers including:

a first layered material comprising ceramic or polymer material and possessing a first thermal conductivity; and one or more subsequent second layered material comprising ceramic or polymer material and possessing at least one of:

(1) a second thermal conductivity lower than the first thermal conductivity; or (2) various levels and length-scales of porosity.

* * * * *